(No Model.)

2 Sheets—Sheet 1.

C. E. BUELL.

MEANS FOR CHARGING AND DISCHARGING SECONDARY BATTERIES.

No. 255,249.

Patented Mar. 21, 1882.

WITNESSES

Fred. G. Dieterich.
Charles H. Baker

INVENTOR
Charles E. Buell,
by Melville Church
His Attorney.

(No Model.) 2 Sheets—Sheet 2.

C. E. BUELL.
MEANS FOR CHARGING AND DISCHARGING SECONDARY BATTERIES.

No. 255,249. Patented Mar. 21, 1882.

WITNESSES

INVENTOR
Charles E. Buell,
by Melville Church
His Attorney.

UNITED STATES PATENT OFFICE.

CHARLES E. BUELL, OF NEW HAVEN, CONNECTICUT.

MEANS FOR CHARGING AND DISCHARGING SECONDARY BATTERIES.

SPECIFICATION forming part of Letters Patent No. 255,249, dated March 21, 1882.

Application filed December 28, 1881. (No model.)

*To all whom it may concern:*

Be it known that I, CHARLES E. BUELL, of New Haven, in the county of New Haven and State of Connecticut, have invented certain new and useful Improvements in Modes of and Means for Charging and Discharging Secondary Batteries; and I do hereby declare the following to be a full, clear, and exact description of the same, reference being had to the accompanying drawings, forming a part of this specification.

It consists primarily in the combination of a charging-circuit, including a dynamo-electric machine or battery, two series of secondary batteries, each of which is composed of two or more pairs of plates, a working-circuit common to both series, and a switching device for alternately connecting the pairs of one series successively to the charging-circuit and at the same time connecting the pairs of the other series into the working-circuit in tension series.

It further consists in the combination, with an electrical generating-machine, of a charging-circuit which includes the helices of the field-of-force magnets, a separate exterior charging-circuit which includes the helix of the armature, a working-circuit, two series of secondary batteries, and devices, substantially as described, for alternately placing the pairs of each series in the exterior circuit of the machine to be charged and in the working-circuit to be discharged.

It further consists in certain other novel combinations and sub-combinations, which will be hereinafter fully described and claimed.

Figure 1:
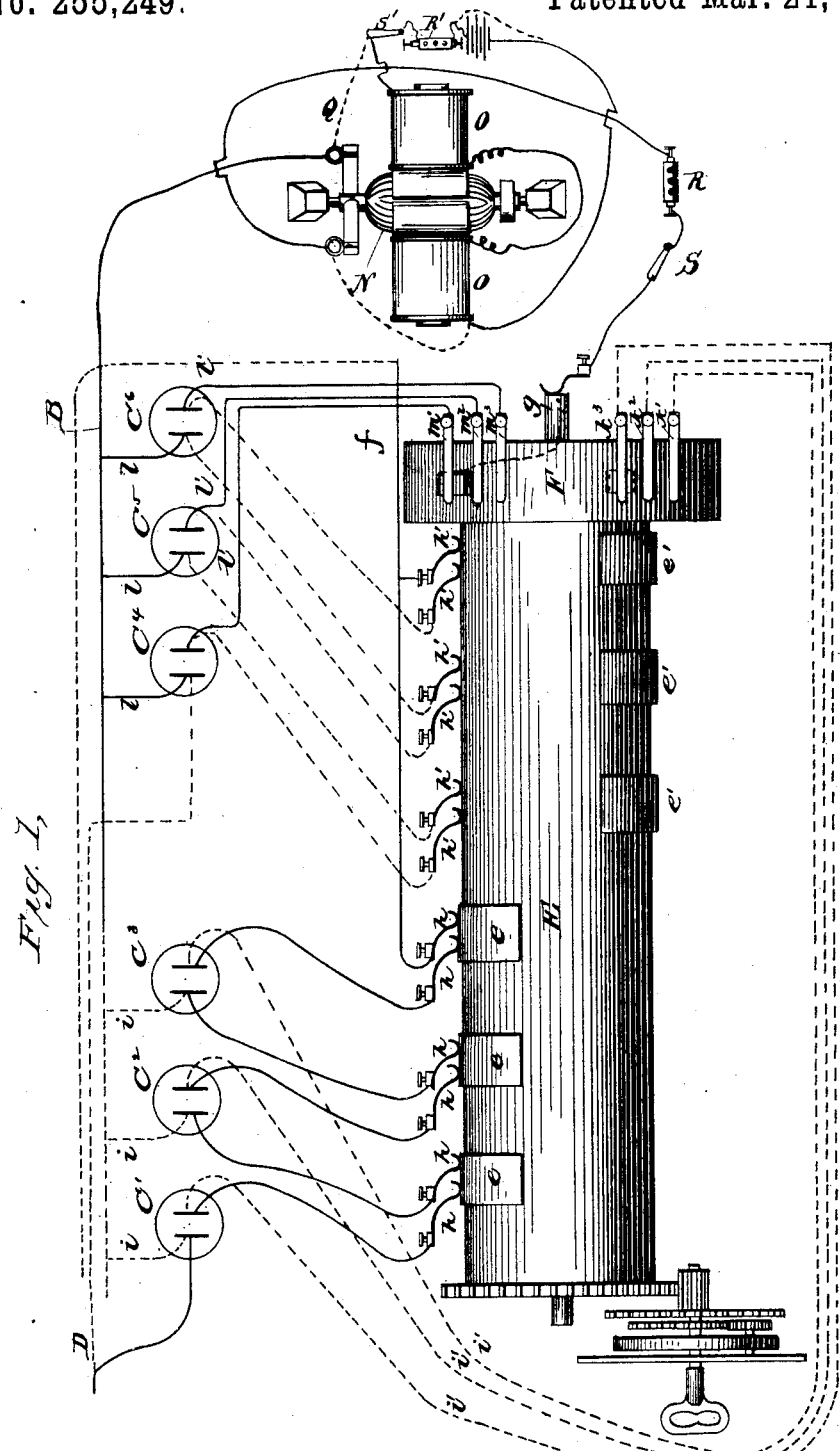
Figure 2:
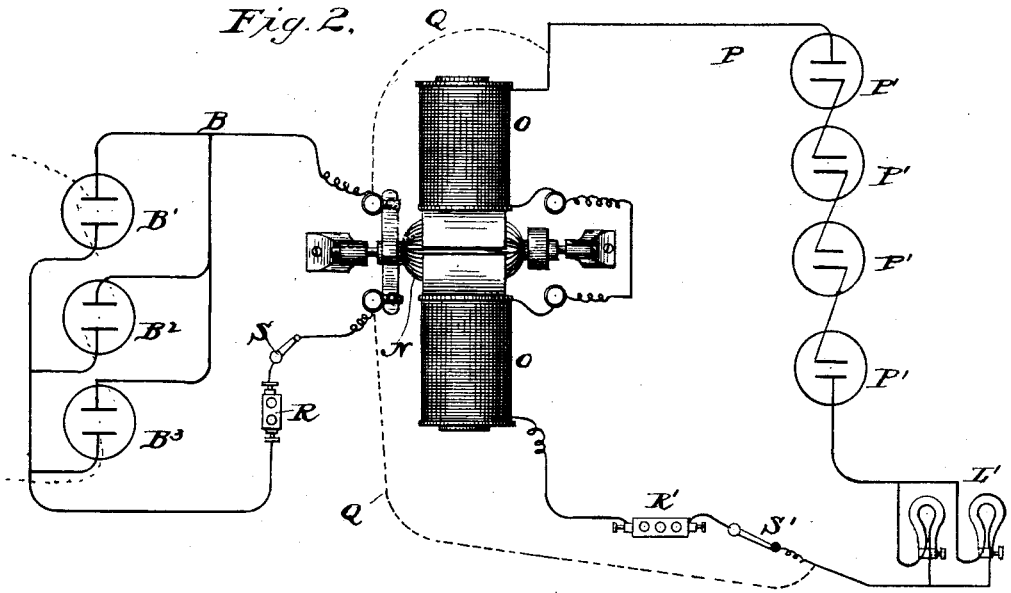
Figure 3:
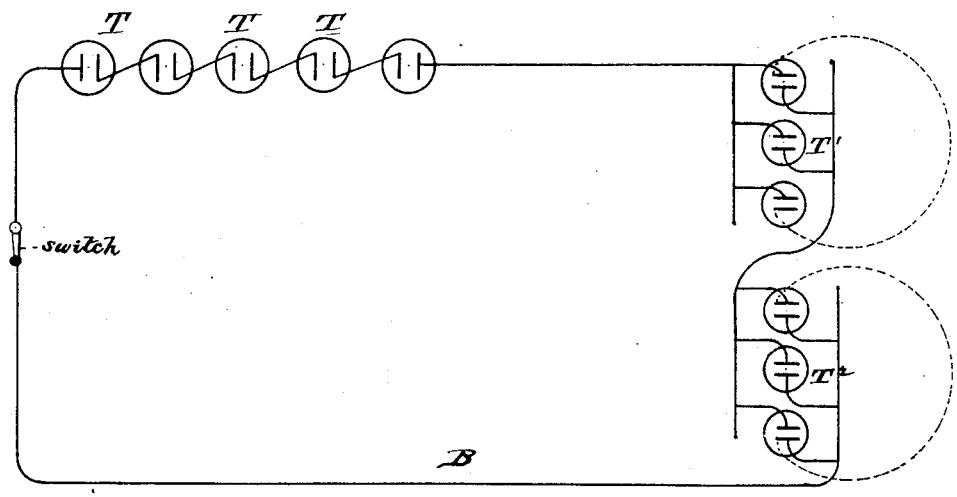

In the accompanying drawings, Figure 1 is a plan view of one embodiment of my invention; Fig. 2, a similar view, showing particularly the dynamo-electric generator and its connections; and Fig. 3 is a diagram showing the mode of charging a series of secondary batteries by means of secondary batteries.

Similar letters of reference in the several figures denote the same parts.

A represents a dynamo-electric machine or generator; B, a charging-circuit charged thereby; $C'$ $C^2$ $C^3$ and $C^4$ $C^5$ $C^6$, two series of secondary batteries adapted to be charged from the main charging-circuit; and D, a working-circuit, into which said secondary batteries are adapted to be discharged.

E is a switch-cylinder, of wood or other non-conducting material, mounted upon suitable bearings and adapted to be given a rotary movement by any suitable means. Upon the periphery of this switch-cylinder are arranged, at one end, a series of metallic projections or cam-surfaces, $e\ e\ e$, and at the other end another series of like metallic projections, $e'\ e'\ e'$, one series of such projections being arranged in advance of the other, and all the projections of each series being in line with each other. The cylinder is provided at one end with a disk, F, formed with or secured to the cylinder, so as to rotate therewith, but preferably, though not essentially, of greater diameter than the cylinder. Mounted upon the periphery of the disk is a metallic projection or cam-surface, $f$, which is in electrical connection with the journal $g$ of the cylinder.

$h\ h\ h\ h\ h\ h$ represent several pairs of spring-contacts, which are adapted, when the cylinder is turned, to be raised by and make connection through the series of metallic projections $e\ e\ e$, so as to discharge the secondary batteries $C'$ $C^2$ $C^3$ into the working-circuit D in tension series; and $h'\ h'\ h'\ h'\ h'\ h'$ are another series of pairs of spring-contacts, which are lifted by and make connection through the metallic projections $e'$ $e'$ $e'$ when the cylinder is further turned, so as to place in a like manner the other series of secondary batteries, $C^4$ $C^5$ $C^6$, in the working-circuit in tension series.

$i\ i\ i$ are lines of wire which connect one plate of each of the batteries $C'$ $C^2$ $C^3$ to the charging-circuit B, and $i'\ i'\ i'$ other lines of wire which connect the other plates of said batteries to a series of spring-contacts, $k'\ k^2\ k^3$, arranged over the disk F. The batteries $C^4$ $C^5$ $C^6$ also each have one of their plates connected to the charging-circuit by wires $l\ l\ l$, and their other plates by wires $l'\ l'\ l'$ to spring-contacts $m'\ m^2\ m^3$, projecting over another part of the disk F. The charging-circuit includes the bearing $g$ of the cylinder, as shown. When the cylinder and disk F are turned the metallic projection $f$ makes connection with the spring-contacts $k'\ k^2\ k^3$ successively, thereby placing the secondary batteries $C'$ $C^2$ $C^3$, one after the other, in succession, in the main charging-circuit to be charged; and upon a further rotation of the cylinder the projection $f$ in like manner makes connection successively with the spring-contacts $m'$ $m^2$ $m^3$, so as to charge successively the second series of secondary batteries, $C^4$ $C^5$ $C^6$. The projection $f$ is so arranged upon the disk F with respect to the projections $e\ e\ e$ and $e'\ e'\ e'$ on the cylinder that while one set of projections on the cylinder are making connection with one set of spring-contacts to discharge one series of batteries the projection on the disk is making connection successively with the spring-contacts of the other series of batteries. By this arrangement it will be seen that one series of secondary batteries are being charged in succession from the charging-circuit while the other series are being discharged in tension series into the working-circuit.

For the purpose of keeping the charging-circuit normally closed during the charging of each set of batteries, the spring-contacts of each series which co-operate with the projection $f$ of the disk are so arranged with respect to said projection that before one contact leaves said projection the succeeding contact engages with it, and thus one at least of the contacts is kept in connection with the projection until the whole series of batteries are charged.

I do not wish to confine myself to the particular mechanism shown for effecting the successive charging of the plates of one series of secondary batteries and the simultaneous discharging of all the plates of another series of secondary batteries in a common working-circuit in tension series, as I regard my invention as covering broadly the improved mode of effecting this result without restriction as to details of mechanism.

The number of series of secondary batteries employed can be multiplied indefinitely, and as many as desired can be charged and discharged at a time in the mode indicated.

Ordinarily where a dynamo-electric machine is employed to charge a circuit including secondary batteries the helices of the field-of-force magnets are included in the charging-circuit, and there is a constantly-recurring back flow of current of short duration from the secondary batteries, which affects the polarity of the field-of-force magnets and detracts from the effective action of the generator. To overcome the disadvantages arising from this back flow of current, I interpose only the armature-helix of the dynamo-electric machine in the charging-circuit including the secondary batteries, and interpose the helices of the field-of-force magnets in an electric circuit extraneous to the charging-circuit. This extraneous circuit may be a galvanic-battery circuit, a circuit derived from the dynamo-electric machine itself, or an independent circuit charged from the secondary batteries.

In Fig. 2, B represents the charging-circuit, including secondary batteries B′ B² B³, an adjustable resistance, R, switching devices S, and the armature-helix N of a dynamo-electric machine.

O O are the helices of the field-of-force magnets included in a circuit, P, containing a series of secondary batteries, P′ P′ P′ P′, a resistance, R′, a switch, S′, and electric lamps L′. The secondary batteries P′ P′ P′ P′ are charged from the main charging-circuit by devices such as shown in Fig. 1, while the batteries B′ B′ B′ are adapted to discharge into a separate independent working-circuit, as also shown in Fig. 1. With an arrangement of this description any back flow upon the main charging-circuit B from the secondary batteries B′ B′ B′ will not materially affect the polarity of the magnets in the field-of-force helices, and the effective energy of the machine will not be injuriously disturbed.

Instead of employing the secondary batteries in the circuit P, connection may be made between the commutator and the helices of the field-of-force magnets, as shown by the dotted lines Q Q, Fig. 2, the circuit thus formed being independent of the charging-circuit.

The variable resistances R and R′ are useful to control the tension of the circuits in which they are located, while the switches S and S′ are for the purpose of opening and closing their circuits.

The charging-circuit including the secondary batteries may be itself charged by means of one or more larger secondary batteries, which are themselves charged from any proper source of electrical power. Such an arrangement is shown in Fig. 3, B representing the charging-circuit, T the secondary batteries for charging the same, and T′ and T² the secondary batteries to be charged from the charging-circuit, and themselves discharging into separate working circuits, as represented by the dotted lines.

Where the helices of the field-of-force magnets are included in the derived circuit Q, any back flow of current from the secondaries does not tend to depolarize the field-of-force magnets, but, on the contrary, tends to strengthen them.

I claim as my invention—

1. The combination, substantially as described, of a charging-circuit including a dynamo-electric machine or battery, two series of secondary batteries, each of which series is composed of two or more pairs of plates, a working-circuit common to both series, and a switching device for alternately connecting the pairs of one series successively to the charging-circuit, and at the same time discharging the pairs of the other series into the working-circuit in tension series.

2. The combination, substantially as described, with an electrical generating-machine, of a charging-circuit which includes the helices of the field-of-force magnets, a separate exterior charging-circuit which includes the helix of the armature, a working-circuit, two series of secondary batteries, and devices, substantially as described, for alternately placing the pairs of each series in the exterior circuit of the machine to be charged and in the working-circuit to be discharged.

3. The combination, with an electrical generating-machine, of a charging-circuit which includes the helices of the field-of-force magnets, a separate exterior charging-circuit which includes the helix of the armature, a working-circuit, two series of secondary batteries, and switching devices for alternately placing the pairs of each series successively in the exterior charging-circuit to be charged and in the working-circuit in tension series to be discharged, whereby the reversal of the magnetic condition of the machine by back flow from the batteries is avoided, and the loss of charge from the back flow of the batteries, if the generator slackens speed or stops, is confined to one pair of plates.

4. The combination, with an electrical generating-machine, of a charging-circuit which includes the helices of its field-of-force magnets, a separate exterior charging-circuit which includes the helix of the armature, a working-circuit, two series of secondary batteries, and devices for placing each series alternately in the exterior charging-circuit of the machine to be charged and in the working-circuit to be discharged, and independent means for separately regulating the circuits which include the armature-helix and the field-of-force magnets, substantially as described.

CHARLES E. BUELL.

Witnesses:
MELVILLE CHURCH,
FRED F. CHURCH.